United States Patent
Mende et al.

(10) Patent No.: US 10,072,727 B2
(45) Date of Patent: Sep. 11, 2018

(54) TORSIONAL-VIBRATION DAMPING SYSTEM FOR A VEHICLE DRIVE TRAIN

(71) Applicant: Schaeffler Technologies GmbH & Co. KG, Herzogenaurach (DE)

(72) Inventors: Hartmut Mende, Bühl (DE); Walter Hepperle, Offenburg (DE); Roland Seebacher, Neuried-Ichenheim (DE)

(73) Assignee: Schaeffler Technologies AG & Co. KG, Herzognaurach (DE)

( * ) Notice: Subject to any disclaimer, the term of this patent is extended or adjusted under 35 U.S.C. 154(b) by 0 days.

(21) Appl. No.: 15/898,345

(22) Filed: Feb. 16, 2018

(65) Prior Publication Data

US 2018/0172110 A1    Jun. 21, 2018

Related U.S. Application Data

(62) Division of application No. 14/362,852, filed as application No. PCT/DE2012/001129 on Nov. 26, 2012.

(30) Foreign Application Priority Data

Dec. 5, 2011 (DE) .......... 10 2011 087 730
Mar. 2, 2012 (DE) .......... 10 2012 203 330

(51) Int. Cl.
*F16F 15/14* (2006.01)
*F16F 15/131* (2006.01)
(Continued)

(52) U.S. Cl.
CPC ............ *F16F 15/14* (2013.01); *F16F 15/129* (2013.01); *F16F 15/131* (2013.01);
(Continued)

(58) Field of Classification Search
CPC .......... F16F 15/14; F16F 15/10; F16F 15/129; F16F 15/131; F16F 15/1407; F16F 15/145; F02D 13/06
See application file for complete search history.

(56) References Cited

U.S. PATENT DOCUMENTS

| 5,246,398 A | 9/1993 | Birk et al. |
| 5,518,100 A | 5/1996 | Birk et al. |

(Continued)

FOREIGN PATENT DOCUMENTS

| DE | 32 42 705 A1 | 5/1984 |
| DE | 3442705 A1 | 5/1986 |

(Continued)

OTHER PUBLICATIONS

Random House Webster's College Dictionary, title page, copyright page, p. 704, Random House, Inc., New York, 1995.

(Continued)

*Primary Examiner* — Vicky A Johnson
(74) *Attorney, Agent, or Firm* — LeKeisha M. Suggs

(57) ABSTRACT

A drive train is disclosed that includes an engine operable in a first engine operating state and a second engine operating state and a torsional-vibration damping system operatively connected to the engine. The torsional-vibration damping system includes a first torsional-vibration damper having a primary inertial mass and a secondary inertial mass, a second torsional-vibration damper, a first centrifugal pendulum arranged on the secondary inertial mass of the first torsional-vibration damper, and a second centrifugal pendulum arranged on the second torsional-vibration damper.

7 Claims, 3 Drawing Sheets

(51) Int. Cl.
*F16F 15/129* (2006.01)
*F02D 13/06* (2006.01)

(52) U.S. Cl.
CPC .......... *F16F 15/1407* (2013.01); *F02D 13/06* (2013.01); *F16F 15/145* (2013.01); *Y10T 74/2128* (2015.01)

(56) References Cited

U.S. PATENT DOCUMENTS

| | | |
|---|---|---|
| 6,401,897 B1 | 6/2002 | Jackel et al. |
| RE38,258 E | 9/2003 | Reik et al. |
| 6,626,276 B2 | 9/2003 | Diemer et al. |
| 6,726,569 B1 | 4/2004 | Seidl et al. |
| 7,360,616 B2 | 4/2008 | Schiele |
| 7,481,132 B2 | 1/2009 | Mende et al. |
| 9,506,518 B2* | 11/2016 | Otanez ................ F16F 15/145 |
| 2003/0100376 A1 | 5/2003 | Friedmann et al. |
| 2003/0221653 A1 | 12/2003 | Brevick et al. |
| 2007/0037659 A1 | 2/2007 | Bailey et al. |
| 2009/0188463 A1 | 7/2009 | Wright |
| 2010/0236228 A1* | 9/2010 | Degler ................ F16F 15/145 60/338 |
| 2010/0242466 A1 | 9/2010 | Krause et al. |
| 2011/0195794 A1 | 8/2011 | Bai et al. |
| 2012/0055283 A1 | 3/2012 | Moser |
| 2012/0080281 A1* | 4/2012 | Takikawa ................ F16H 45/02 192/3.28 |

FOREIGN PATENT DOCUMENTS

| | | |
|---|---|---|
| DE | 3703123 A1 | 9/1987 |
| DE | 100 18 955 A1 | 10/2001 |
| DE | 100 36 720 A1 | 2/2002 |
| DE | 10 2005 011 910 A1 | 12/2005 |
| DE | 10 2006 028 556 A1 | 1/2007 |
| DE | 10 2009 042 837 A1 | 4/2010 |
| DE | 10 2009 050 353 A1 | 5/2010 |
| DE | 10 2010 005 599 A1 | 8/2010 |
| DE | 10 2010 018 941 A1 | 12/2010 |
| DE | 10 2010 022 252 A1 | 1/2011 |
| DE | 10 2010 049 930 A1 | 5/2011 |
| DE | 10 2011 077 121.2 A1 | 6/2011 |
| DE | 10 2011 012 606 A1 | 9/2011 |
| EP | 1780434 A2 | 5/2007 |
| EP | 2282078 A2 | 2/2011 |
| EP | 2718586 | 4/2014 |
| WO | 2010043301 A1 | 4/2010 |
| WO | 2011110153 A1 | 9/2011 |
| WO | 2012/168026 A1 | 12/2012 |

OTHER PUBLICATIONS

Automotive Technology, Third Edition, M. J. Nunnery, title page, copyright page, pp. 35, 36, Society of Automotive Engineers, Warrendale, PA, 1998.

* cited by examiner

TORSIONAL-VIBRATION DAMPING SYSTEM FOR A VEHICLE DRIVE TRAIN

TECHNICAL FIELD

The present disclosure relates to a drive train including an internal combustion engine and a torsional-vibration damping system.

BACKGROUND

Drive trains of this general type are typically used in motor vehicles. They include an internal combustion engine, a transmission, and a drive for driving the motor vehicle. Torsional-vibration damping systems that include one or more torsional-vibration dampers, for instance, are known in the art for isolating and damping torsional vibration of the internal combustion engine. The torsional-vibration dampers are preferably arranged on the crankshaft, or on a transmission input shaft of the transmission, and can be divided flywheels, torsional-vibration dampers in clutch discs of a friction clutch arranged between the crankshaft and the transmission input shaft and the like, and are known, for example, from the documents DE 37 03 123 A1 and DE 34 42 705 A1. Furthermore centrifugal pendulums have become known in the art as torsional vibration dampers, for example from the document DE 10 2010 005 599 A1. These centrifugal pendulums form a rotary-speed adaptive torsional-vibration damper by means of pendulum masses that may pivot to a limited extent relative to a pendulum flange received with the crankshaft or transmission input shaft. Moreover, combinations of centrifugal pendulums and the aforementioned torsional-vibration dampers are known, for example, from WO 2011/110153 A1, DE 10 2010 018 941 A1, and DE 10 2010 022 252 A1. The torsional-vibration damping system is adapted to the torsional-vibration behavior of the internal combustion engine, for example to the vibration order thereof. For four-stroke engines with four cylinders the vibration orders equal two and for four-stroke engines with two cylinders, the vibration orders equal one, for example.

DE 100 36 720 A1, for instance, discloses an internal combustion engine wherein a predefined number of cylinders can be switched off to save energy in driving situations that have low load requirements, and can be switched back on when a corresponding torque is required. The result is an internal combustion engine with two modes of operation in one drive train with different vibration orders, and thus different torsional-vibration behavior.

An object of the present disclosure is to provide a drive train that achieves an improved torsional-vibration behavior in both operating states of the internal combustion engine as a result of an adaptable torsional-vibration system.

SUMMARY

The object is attained by a drive train including an internal combustion engine with a predefined number of cylinders, with a first operating state in which all cylinders are in operation, and a second operating state in which some of the cylinders are switched off. The drive train further includes a torsional-vibration damping system with at least one torsional-vibration damper and at least one centrifugal pendulum, wherein a centrifugal pendulum and optionally a torsional-vibration damper are adapted to the torsional-vibration behavior of one operating state, and a torsional-vibration damper and optionally a second centrifugal pendulum are adapted to the torsional-vibration behavior of the other operating state. The use of multiple components of the torsional-vibration damping system in the form of at least one centrifugal pendulum and at least one torsional-vibration damper can improve the torsional-vibration behavior of the two operating states of the internal combustion engine selectively for each operating state. One or more components can be associated with each operating state.

One or more torsional-vibration dampers can be embodied as a divided flywheel with a spring device that is arranged between a primary inertial mass associated with the crankshaft, and a secondary inertial mass associated with a transmission input shaft of a transmission, and is arranged to be effective in the circumferential direction and has at least one damper stage. One or more torsional-vibration dampers can be embodied as a torsional-vibration damper with at least one damper stage in a clutch disc of a friction clutch that is arranged between the internal combustion engine and a transmission in the drive train, or as a similar system. If multiple damper stages are provided in a torsional-vibration damper, one damper stage can be associated with one operating state and the other damper stage can be associated with the other operating state and can be adapted to improve the torsional-vibration behavior thereof. For this purpose, the stiffnesses of the damper stages in the circumferential direction and rotation angles between the input and output parts of the torsional-vibration dampers are adapted in a corresponding way. In this context, higher degrees of stiffness are particularly advantageous for the damping and transmission of higher torques at comparatively small rotation angles, and lower degrees of stiffness are particularly advantageous for the compensation of vibrations at lower torques and larger rotation angles. The damper stages of lower stiffness are preferably by-passed at higher torques to protect them. The spring device can be formed of arc springs and/or coil springs. It is preferred that in one damper stage of a divided flywheel arc springs be provided, and otherwise helical compression springs be provided.

One or more centrifugal pendulums can be arranged at different locations of the drive train. It can be advantageous to adapt a single centrifugal pendulum to different orders of vibration, for example by providing pendulum masses of different vibration behaviors in that the pendulum masses include masses and/or vibration angles adapted to a respective order of vibration. A respective centrifugal pendulum can be arranged on the primary or secondary inertial mass of a torsional-vibration damper and/or on a torsional-vibration damper in a clutch disc, or on a friction clutch arranged between the crankshaft and the transmission input shaft in the drive train.

BRIEF DESCRIPTION OF THE DRAWINGS

The present disclosure will be explained in more detail below based on the exemplary embodiments shown in FIGS. 1 to 14, wherein.

DETAILED DESCRIPTION

Figure 1:
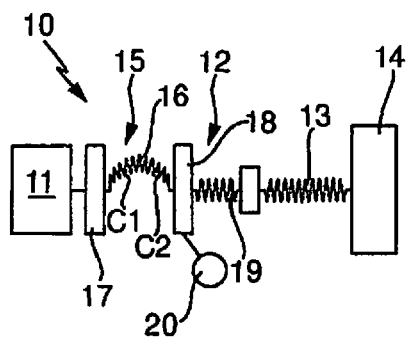
FIG. 1 is a diagrammatic representation of a section of a drive train that includes a torsional-vibration damping system with two torsional-vibration dampers and a secondary-side centrifugal pendulum.

FIG. 1 is a diagrammatic representation of a drive train 10 that includes an internal combustion engine 11 selectively operable in two operating states with four or two cylinders. Drive train 10 includes a torsional-vibration damping system 12, as well as a unit 14 that diagrammatically indicates a transmission and a vehicle body and is coupled in a torsionally flexible way by a torsional flexibility element 13. The torsional-vibration damping system 12 is formed by a first torsional-vibration damper 15, embodied as a divided flywheel 16 with a primary inertial mass 17 and a secondary inertial mass 18, by a downstream second torsional-vibration damper 19 integrated in a clutch disc of a friction clutch, and by a primary-side centrifugal pendulum 20. A spring device having spring rates $c_1$ and $c_2$ is associated with the first two-stage torsional-vibration damper 15. To improve the torsional-vibration behavior of the first operating state of the internal combustion engine 11 with all cylinders (four in the illustrated embodiment) in operation, the centrifugal pendulum 20 is adapted to the order of vibration one. Furthermore, the second damper stage having the spring rate $c_2$ of higher stiffness is adapted to be in operation in the second operating state.

Due to the fact that cylinders are switched off, a lower torque is applied to the torsional-vibration damping system 12 in the second operating state, so that the torsional-vibration behavior can be improved by means of the first, softer damper stage having the spring rate $c_1$. The second torsional-vibration damper 19 can selectively or overall be associated with one operating state.

Figure 2:
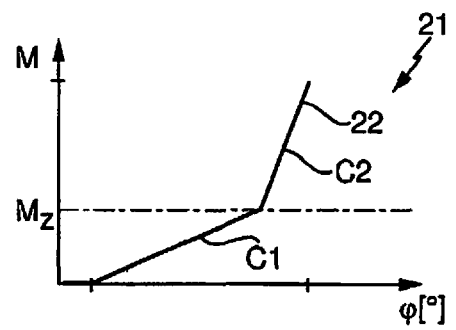
FIG. 2 is a characteristic torque curve of the drive train shown in FIG. 1.

FIG. 2 illustrates a graph 21 in which the torque M of the first torsional-vibration damper 15 of FIG. 1 is plotted above the angle of rotation (p of the inertial masses 17, 18 in a characteristic torque curve 22. Since in the second operating state of the internal combustion engine 11 the maximum switch-off torque M, with switched-off cylinders is correspondingly reduced, a sufficient damping effect can be achieved by the damper stage that has the spring rate $c_1$, whereas when the cylinders are switched on in the second operating state, when the torque is above the switch-off torque $M_2$, the second damper stage that has the spring rate $c_2$ and the centrifugal pendulum 20, whose effect is not visible here, are effective as a damper that is adaptive to the rotary speed.

Figure 3:
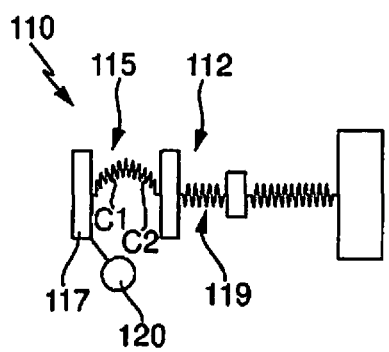
FIG. 3 is a diagrammatic representation of a section of a drive train that includes a torsional-vibration damping system with two torsional-vibration dampers and a primary-side centrifugal pendulum.

FIG. 3 illustrates a drive train 110 different from the drive train 10 of FIG. 1 in that the torsional-vibration damping system 112 with the first torsional-vibration damper 115 and the second torsional-vibration damper 119 includes the primary-side centrifugal pendulum 120 arranged on the inertial mass 117. The centrifugal pendulum 120 is adapted to the vibration order of the internal combustion engine when all cylinders are in operation, i.e., to the first operating state, which in the case of a four-cylinder engine according to the 4-stroke principle is vibration order two. As the primary-side inertial mass 117 is increased by the centrifugal pendulum 120, the second operating state also benefits due to a more efficient damping, although the centrifugal pendulum 120 is not adapted to the order of vibration thereof.

Figure 4:
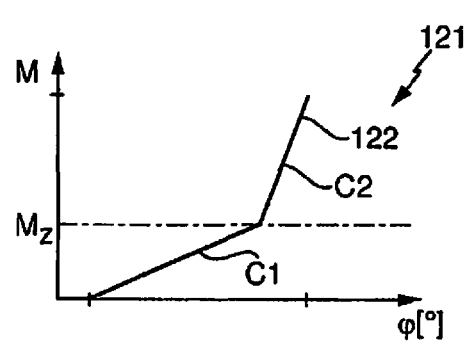
FIG. 4 is a characteristic torque curve of the drive train shown in FIG. 3.

FIG. 4 illustrates a graph 121 resulting from the torsional-vibration damper 115 of FIG. 3, with characteristic torque curve 122 and with the two spring rates $c_1$, $c_2$ associatable with the two damper stages in a way corresponding to graph 21 of FIG. 2.

Figure 5:
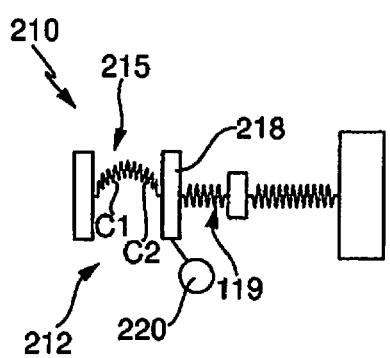
FIG. 5 is a diagrammatic representation of a section of a drive train similar to the drive train shown in FIG. 1, and including a torsional-vibration damping system with two torsional-vibration dampers with a modified characteristic curve and a secondary-side centrifugal pendulum.
Figure 6:
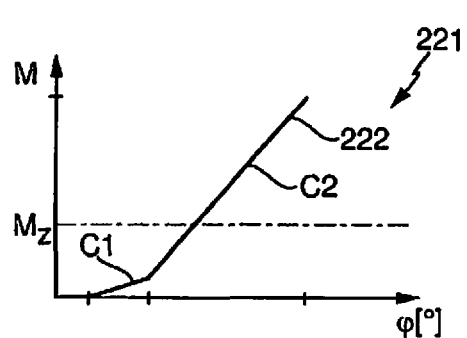
FIG. 6 is a characteristic torque curve of the drive train shown in FIG. 5.

FIG. 5 illustrates a drive train 210, which is similar to the drive train 10 of FIG. 1. Drive train 210 includes a torsional-vibration damping system 212 with two torsional-vibration dampers 215, 219 and a secondary-side centrifugal pendulum 220 arranged on the secondary inertial mass 218. As it is apparent from the graph 221 of FIG. 6 illustrating the characteristic torque curve 222, in contrast to the second damper stage with the spring rate $c_2$ of the first torsional-vibration damper 15 of FIG. 1, the second damper stage with the spring rate $c_2$ of the first torsional-vibration damper 215 is effective over a wide torque range in both operating states of the internal combustion engine. The first damper stage can damp torsional-vibration during the idle phase, or it can be dispensed with to simplify the first torsional-vibration damper 215.

Figure 7:
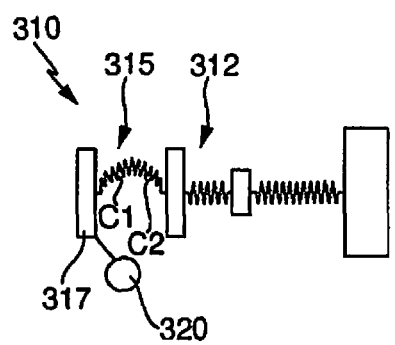
FIG. 7 is a diagrammatic representation of a section of a drive train similar to the drive train shown in FIG. 1 and including a torsional-vibration damping system with two torsional-vibration dampers with a modified characteristic curve and a primary-side centrifugal pendulum.
Figure 8:
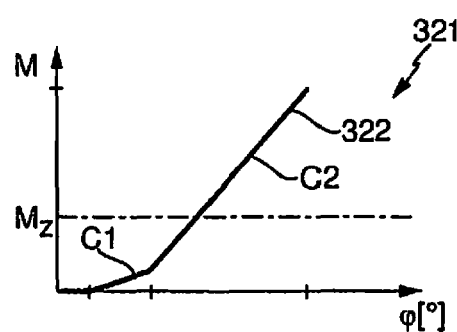
FIG. 8 is a characteristic torque curve of the drive train shown in FIG. 7.

In a corresponding way, FIG. 7 illustrates a drive train 310 similar to the drive trains 110, 210 of FIGS. 3 and 5 and including a corresponding torsional-vibration damping system 312, wherein the centrifugal pendulum 320 is arranged on the primary inertial mass 317 of the first torsional-vibration damper 315. As it is apparent from the graph 321 of FIG. 8 with characteristic torque curve 322, the damper stages with the spring rates $c_1$, $c_2$ of the first torsional-vibration damper 315 are similar to those of the torsional-vibration damper 215 of FIG. 5.

Figure 9:
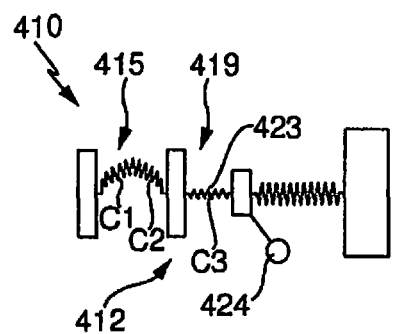
FIG. 9 is a diagrammatic representation of a section of a drive train that includes a torsional-vibration damping system with two torsional-vibration dampers and a centrifugal pendulum arranged on a torsional-vibration damper of a clutch disc.

FIG. 9 illustrates a drive train 410 including a torsional-vibration damping system 412 with two torsional-vibration dampers 415, 419 and a centrifugal pendulum 424, which, in contrast to the drive trains described above, is arranged on the second torsional-vibration damper 419, for example a torsional-vibration damper of a clutch disc. The torsional-vibration damping system improves the torsional vibration of the drive train 410 in that the centrifugal pendulum 424 arranged on the second torsional-vibration damper 419, and a second damper stage of high stiffness with the spring rate c2, are adapted to the torsional-vibration behavior of the first operating state, i.e., on the order of vibration two of a four-cylinder engine in accordance with the 4-stroke principle. A first damper stage of low stiffness with the spring rate c1 and additionally, or alternatively, a spring device 423 of the second torsional-vibration damper 419, are adapted to the torsional-vibration behavior of the second operating state.

Figure 10:
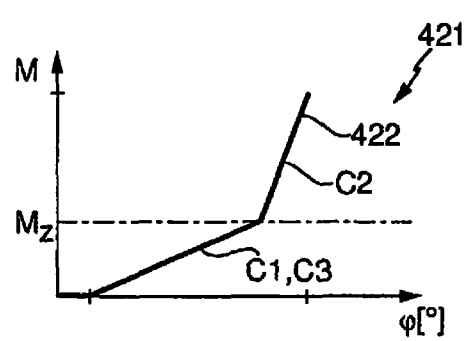
FIG. 10 is a characteristic torque curve of the drive train shown in FIG. 9.

FIG. 10 illustrates a graph 421 with characteristic torque curve 422 of the torsional-vibration damping system 412 of FIG. 9. Up to the maximum switch-off torque M, in the second operating state with partially switched-off cylinders of an internal combustion engine corresponding to the internal combustion engine 11 of FIG. 1, the first damper stage of the first torsional-vibration damper 415 with the spring rate c1 and, additionally or alternatively, for a one-stage torsional-vibration damper 415, the spring device 423 with the spring rate c3 of the second torsional-vibration damper 419 are provided. For torques above the switch-off torque M, when all cylinders are in operation in the first operating state of the internal combustion engine, the second damper stage with the spring rate c2 is provided to damp the torsional-vibrations.

Figure 11:
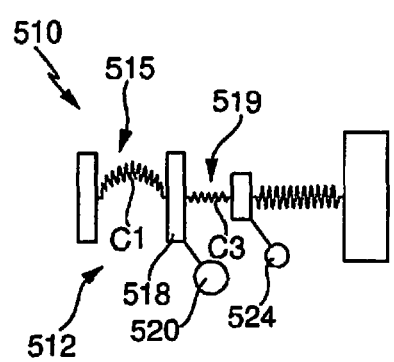
FIG. 11 is a diagrammatic representation of a section of a drive train that includes a torsional-vibration damping system with two torsional-vibration dampers and a respective centrifugal pendulum on a torsional-vibration damper.

FIG. 11 illustrates a drive train 510, which is similar to drive train 410 and includes a torsional-vibration damping system 512. In contrast to the aforementioned drive trains, in the drive train of FIG. 11 a centrifugal pendulum 520, 524 is arranged on each of the torsional-vibration dampers 515, 519. The centrifugal pendulum 520 arranged on the secondary inertial mass 518 of the first torsional-vibration damper 515 is adapted to the torsional-vibration behavior of the first operating state, for example with torsional vibrations of vibration order two. The centrifugal pendulum 524 arranged on the second torsional-vibration damper 519 is adapted to the torsional-vibration behavior of the second operating state, for example with torsional vibrations of vibration order one. Alternatively, the centrifugal pendulum 520 arranged on the secondary inertial mass 518 of the first torsional-vibration damper 515 can be adapted to the torsional-vibration behavior of the second operating state, and the centrifugal pendulum 524 arranged on the second torsional-vibration damper 519 can be adapted to the torsional-vibration behavior of the second operating state.

Figure 12:
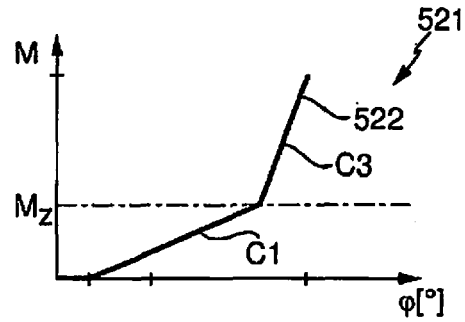
FIG. 12 is a characteristic torque curve of the drive train shown in FIG. 11.

As is apparent from graph 521 of FIG. 12 with characteristic torque curve 522, a first spring device of low stiffness is provided for torques up to the maximum switch-off torque M, and a second spring device of high stiffness is provided for higher torques of the internal combustion engine. Both torsional-vibration dampers 515, 519 can be one-stage dampers, and a respective torsional-vibration damper can be associated with each operating state and centrifugal pendulum 520, 524. Torsional-vibration damper 515 is preferably provided with a spring device of low stiffness, for example in the form of arc springs with spring rate c1, whereas the torsional-vibration damper 519 provided in a clutch disc includes a spring device of greater stiffness with spring rate c3. In contrast to the torsional-vibration damping system 512 of the two FIGS. 11 and 12, a clutch disc without a torsional-vibration damper and including only one centrifugal pendulum 524 can be provided, whereas torsional-vibration damper 515 has damper stages of different stiffness corresponding to spring rates c1, c3 of diagram 521.

Figure 13:
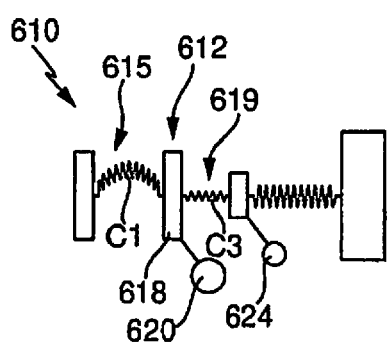
FIG. 13 is a diagrammatic representation of a section of a drive train similar to the drive train shown in FIG. 11 and including a torsional-vibration damping system with two torsional-vibration dampers and a respective centrifugal pendulum arranged on a torsional-vibration damper.
Figure 14:
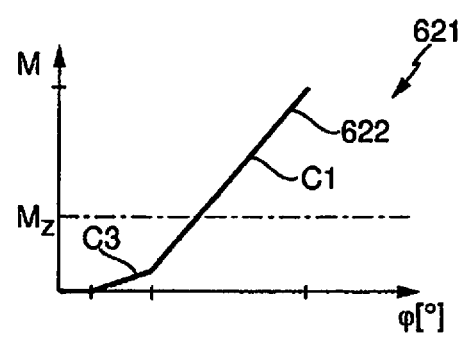
FIG. 14 is a characteristic torque curve of the drive train shown in FIG. 13.

FIG. 13 illustrates a drive train 610 similar to the drive train 510 of FIG. 11 and including a torsional-vibration damping system 612. Here, each of the two centrifugal pendulums 620, 624 is adapted to a respective degree of vibration of an operating state. For instance, the centrifugal pendulum 624 that is arranged on the second torsional-vibration damper 619 is adapted to the torsional-vibration behavior of the first operating state, and the centrifugal pendulum 620 that is arranged on a secondary inertial mass 618 of the first torsional-vibration damper 615 is adapted to the torsional-vibration behavior of the second operating state. As it is apparent from the graph 621 of FIG. 14 with the characteristic torque line 622, the damper stages of the torsional-vibration dampers 615, 619 are selected in such a way that a spring device of high stiffness is effective even below the maximum switch-off torque M, and only a pre-damper stage of low stiffness is effective. In the illustrated exemplary embodiment, the damper stage that has spring rate c1 is associated with the first torsional-vibration damper 615, whereas the soft damper stage that has spring rate c3 is associated with torsional-vibration damper 619. In further embodiments, the association of the damper stages with the torsional-vibration dampers 615, 619 can be reversed, or only one two-stage torsional-vibration damper 615 having damper stages with spring rates c1, c3 can be provided, with the corresponding centrifugal pendulum 620 arranged on the clutch disc without torsional-vibration damper.

What is claimed is:

1. A drive train, comprising:
   an engine operable in a first engine operating state and a second engine operating state;
   a torsional-vibration damping system operatively connected to the engine, the torsional-vibration damping system including:
      a first torsional-vibration damper having a primary inertial mass and a secondary inertial mass;
      a second torsional-vibration damper;
      a first centrifugal pendulum arranged on the secondary inertial mass of the first torsional-vibration damper; and
      a second centrifugal pendulum arranged on the second torsional-vibration damper.

2. The drive train of claim 1, wherein the first centrifugal pendulum is configured to control a torsional-vibration behavior of the engine during the first engine operating state, and the second centrifugal pendulum is configured to control the torsional-vibration behavior of the engine during the second engine operating state.

3. The drive train of claim 2, wherein the first centrifugal pendulum is configured to control the torsional-vibration behavior of the engine with torsional vibrations of vibration order two, and the second centrifugal pendulum is configured to control the torsional-vibration behavior of the engine with torsional vibrations of vibration order one.

4. The drive train of claim 1, wherein the first torsional-vibration damper further includes a first spring device of a first stiffness with a first spring rate, and the second torsional-vibration damper further includes a second spring device of a second stiffness with a second spring rate, wherein the second stiffness of the second spring device is greater than the first stiffness of the first spring device.

5. The drive train of claim 4, wherein the first spring device includes arc springs.

6. The drive train of claim 4, wherein the first spring device is provided for torques up to a maximum switch-off torque, and the second spring device is provide for torques higher than the maximum switch-off torque.

7. The drive train of claim 1, wherein the first torsional-vibration damper and the second torsional-vibration damper are one-stage dampers.

\* \* \* \* \*